United States Patent Office 3,024,432
Patented Mar. 6, 1962

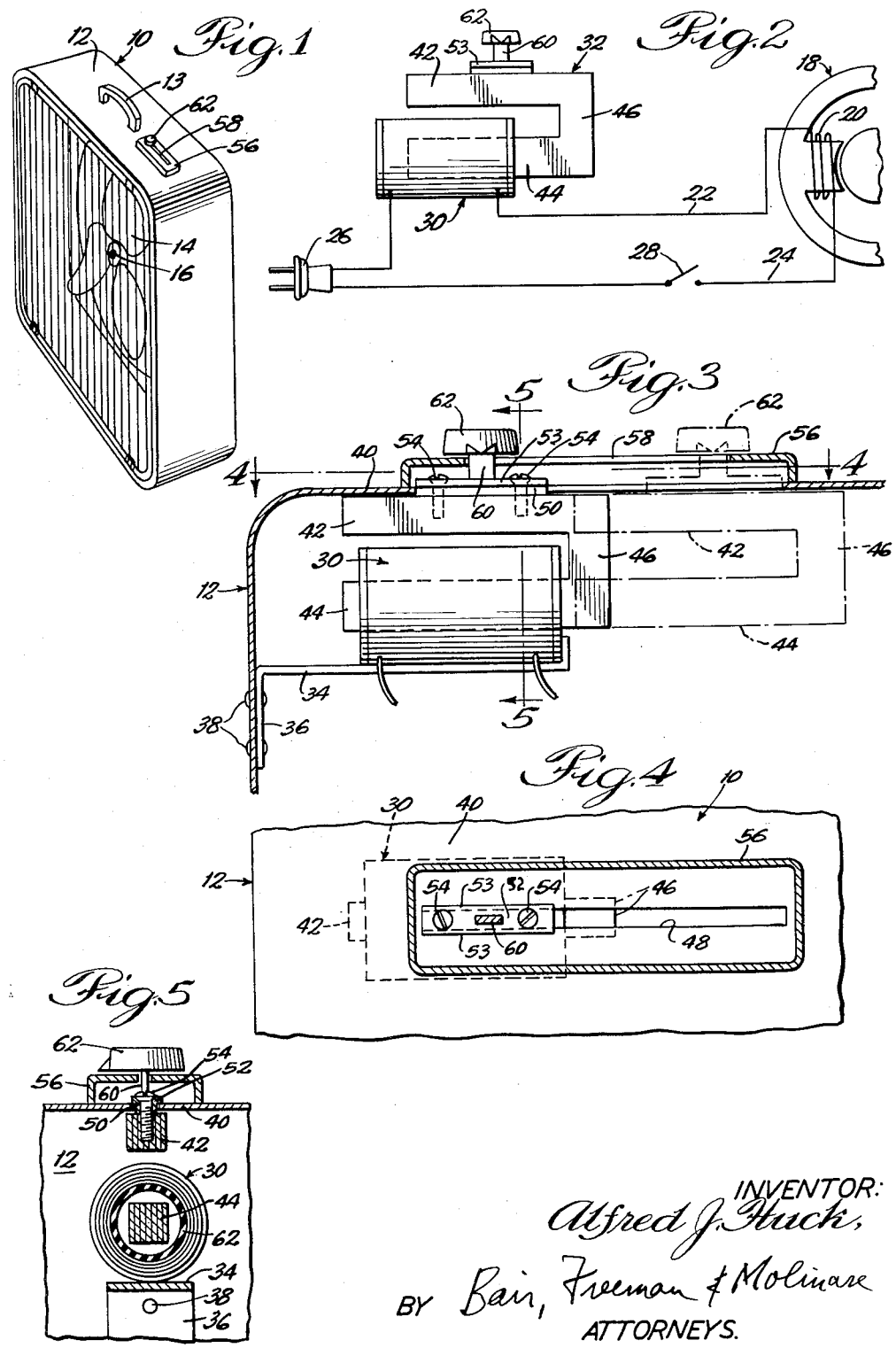

3,024,432
SPEED CONTROLS FOR ELECTRIC MOTORS
Alfred J. Huck, St. Louis, Mo., assignor to Knapp-Monarch Company, St. Louis, Mo., a corporation of Delaware
Filed Sept. 8, 1959, Ser. No. 838,546
1 Claim. (Cl. 336—65)

This application relates generally to electric control apparatus and more particularly to improvements in spaced controls for electric motor driven apparatus, such as fans and the like.

This application is a continuation in part of my co-pending applications, Serial No. 669,526, filed July 2, 1957, and Serial No. 674,871, filed July 29, 1957, both now abandoned. In the first of said co-pending applications there is disclosed the broad concept of a choke-coil type variable speed control adapted to enable the speed of an electric motor to be varied in a continuous manner over its entire operating range, to the end that a substantially large number of selectable motor speeds are provided. As pointed out in said co-pending applications, such an arrangement provides a considerable advantage over prior art control devices having only a relatively few preset operating speeds. In the second of said applications, linear movement between a choke-coil and a magnetic shell effects the desired control.

It is a general object of this invention to provide a new and improved construction for a variable speed control adapted to be used with electric motor driven apparatus.

It is another object of this invention to provide a new and improved choke-coil type variable speed control for an electric motor in which there is provided a choke-coil and a choke shell therefor, and wherein the coil is maintained stationary while the shell may be selectively moved for enabling the reactive impedance of the choke to be varied as desired without moving the coil or the wires leading to the coil.

It is a further feature of this invention to provide a new and improved choke-coil variable speed control, as described above, in which the shell assembly for use with the choke-coil is slidably connected to a manually actuatable control knob for enabling the electric motor speed to be controlled in an efficient and, if desired, continuously variable manner.

It is still a further object of this invention to provide an improved variable speed control for an electric motor which is characterized by its relative simplicity and its economy of construction and operation.

These and other objects are realized in accordance with a specific illustrative embodiment of this invention in which the choke-coil is connected in series with the electric motor and the source of power for the motor. The choke-coil normally has a relatively low resistance, comprising primarily the resistance of the copper windings of the coil, and as a result, the heat loss due to the I.R. drop in the choke-coil also is relatively small. Therefore, most of the voltage drop across the choke assembly is due to its inductive reactance, and when this reactance is high, the voltage applied from the power source to the electric motor is low, and vice versa. Thus, the voltage applied to the motor and consequently the motor speed, can be controlled by varying the inductive reactance of the choke in series therewith.

In accordance with the specific illustrative embodiment of the invention disclosed herein, the coil is affixed to the housing as by means of suitable brackets or the like, and the choke shell is mechanically coupled to a manually actuatable speed control knob so as to be slidable therewith relative to the choke-coil. This construction enables the reactive impedance of the choke assembly, and hence the speed of the electric motor, to be varied in a selective manner, as above, but the additional advantage of this embodiment resides in the elimination of movable lead wires. It will be appreciated by those skilled in the art that this construction serves to remove a possible source of wear in the operation of the speed control device.

The above and other features of novelty which characterize the invention are pointed out with particularity in the claims annexed to and forming a part of this specification. For a better understanding of the invention, however, its advantages and specific objects attained with its use, reference is had to the accompanying drawing and descriptive matter in which is shown and described several illustrative embodiments of the invention.

In the drawing:

FIGURE 1 is a perspective view of a fan embodying a control therefor constructed in accordance with the principles of this invention;

FIGURE 2 is a schematic diagram of the speed control circuit for the fan of FIGURE 1;

FIGURE 3 is a fragmentary view in cross-section through the housing and through the parts of the specific speed control provided;

FIGURE 4 is a cross-section view taken on line 4—4 of FIGURE 3; and

FIGURE 5 is a cross-section view taken on line 5—5 of FIGURE 3.

Turning now to the drawings, there is shown in FIGURE 1 a fan generally indicated at 10, which includes a peripheral casing 12 having a carrying handle 13 projecting from the top side thereof. The casing 12 is arranged to surround the fan which includes a bladed propeller 14 mounted for rotation with the shaft 16 of a motor.

FIGURE 2 diagrammatically illustrates a typical wiring for the device herein disclosed, and includes a motor generally indicated at 18, the rotating shaft 16 of which is adapted to carry the fan 14. The motor 18 includes a motor-winding, for example at 20, from which extends a pair of energizing leads 22 and 24 and which are adapted to be energized through the medium of a service plug 26. The electrical system may include an on-off switch 28 interposed in lead 24, and a motor-controlling, annular, choke-coil generally indicated at 30 interposed in lead 22. There is also provided a magnetic choke shell generally indicated at 32 adapted for cooperation with the choke-coil 30.

In accordance with one important aspect of this invention, the amount of voltage drop across the choke-coil 30 may be selectively varied by changing the position of the magnetic shell 32 relative to the coil 30.

As seen in FIGURES 3–5, the annular choke-coil 30 is stationarily mounted within the peripheral casing, or housing, 12 by means of a bracket 34, the leg 36 of which is secured by appropriate means, such as rivets 38 to a portion of casing 12. The coil 30 is disposed so that the axis of the central recess thereof is disposed parallel to a control portion 40 of peripheral casing 12.

The magnetic shell 32 is formed by a stack of laminations of magnetic material which are secured together. The magnetic shell 32 defines at least a pair of spaced legs, including a guide leg 42 and choke leg 44 which are joined together at one end by bight 46. In its simplest form, and when the shell 32 defines only two spaced legs, then the shell 32 is generally U-shaped, as seen in FIGURES 2 and 3.

The control portion 40 of peripheral casing 12 is flat and is spaced from coil 30 and is provided with an elongated slot 48 therein, which slot extends parallel to the axis of the annular choke-coil 30. The length of the slot 48 is at least as great as the length of the annular choke-coil 30, to provide for a range of movement of magnetic shell 32 relative to choke-coil 30, so that the choke leg 44 may be moved relative to coil 30 throughout its entire length. Thus, as shown in FIGURE 3, at one extreme end of the movement of shell 32, as shown in full lines, the choke leg 44 thereof extends completely through coil 30, while at the other extreme end of movement of shell 32, as seen in dot-dash lines in FIGURE 3, the choke leg 44 is completely withdrawn from the central aperture of choke-coil 30.

There is provided a slot-engaging guide element 50 and a support plate 52, and the parts are connected in assembled relation, as shown, to the guide leg 42 of the magnetic shell 32 by means of a pair of screws 54. The support plate 52 is of a lateral dimension greater than the width of slot 48, so that the longitudinal edges of support plate 52 provide flanges 53 which engage the upper side of control portion 40 of the casing 12 to support the magnetic shell 32 thereby. The leg 42 of the magnetic shell 32 is adapted to engage along its length with the inner surface of the flat control portion 40, so that said guide leg 42 and the flanges 53 cooperate to permit sliding engagement of the magnetic shell 32 relative to the control portion 40 of the casing, and so as to maintain the choke leg 44 at a predetermined spacing from the control portion 40 of the casing. The slot-engaging guide 50 extends between the spaced parts 52 and 42 and passes through the slot 48 and engages the longitudinal edges of slot 48 to restrain movement of the magnetic shell 32 to directions parallel to the longitudinal axis of slot 48.

In addition to the foregoing structure, there may be provided a removable cover plate, or shell 56, provided with an elongated slot 58 therein, which cover plate 56 overlies the structure thus far described. The support plate 52 is provided with an upstanding flange 60 having button-engaging upstanding portions to which a manual control button 62 may be frictionally connected.

From the foregoing it will be understood that the choke-coil 30, being in series circuit between the source of power and the winding 20 of the electric motor, provides a very simple means, in cooperation with the movable magnetic shell 32, for controlling the speed of the motor 18. It will be understood that as the magnetic shell 32 is in the dot-dash line position shown in FIGURE 3, with the choke leg 44 fully removed from the center bore of coil 30, the reactive impedance of the choke-coil 30 is least, and the voltage drop across the winding 20 of motor 18 is maximum, and therefore the motor speed is at its highest speed within its operating range. Conversely, when the magnetic shell 32 is in the full-line position shown in FIGURE 3, the reactive impedance of the choke-coil 30 and the voltage drop across choke-coil 30 is greatest, and the speed of motor 18 is at its lowest value within its operating range. For intermediate positions of choke leg 44 between the two limits described there exists a continuous variation in the voltage drop across choke-coil 30, thereby providing a continuous graduation of speeds produced by motor 18 within the motor's operating range.

In the preferred form, the choke-coil 30 may be formed of copper wire wound on a nylon plastic annular bobbin 62, as best seen in FIGURE 5, to add resilience to the coil and to facilitate the free sliding movement of the choke 44 within coil 30 and relative to the coil 30. The plurality of laminations which comprise the magnetic shell 32 may be assembled in any manner well known in the art and may, for example, be riveted together and then dipped in varnish and baked, to eliminate vibration noise in this speed control.

It will be appreciated from the foregoing that the control herein provided has many positive advantages. The assembly is extremely simple and provides a reliable, variable-speed control. The choke-coil 30 is stationarily mounted, thereby eliminating any flexing of the wires which connect to the coil 30 and thereby eliminating any wear accompanying such flexing. The magnetic shell is of standard construction, and one leg of the shell is utilized, in part, as a portion of the guide means for effecting guided sliding movement of the magnetic shell relative to the choke-coil; and very simple, but efficient, guide means are provided for restraining movement of the choke leg 44 of the magnetic shell along a selected predetermined path.

While there has been shown and described a particular embodiment of this invention, it will be obvious to those skilled in the art that various changes and modifications may be made therein without departing from the invention and, therefore, it is intended in the appended claim to cover all such changes and modifications as fall within the true spirit and scope of the invention.

What I claim as new, and desire to secure by Letters Patent of the United States, is:

A mounting and guiding arrangement for an inductive motor speed control reactor which permits linear sliding movement of the reactor relative to a fixed coil comprising the combination of a housing; an annular choke coil having a central opening fixedly mounted within said housing with the axis of said coil disposed parallel to a substantially flat control portion of said housing, said coil being spaced from said flat control portion; a magnetic shell having at least two elongated, parallel legs which are joined together at one end by a linking member, one of said legs being an abutment leg, and the other of said legs serving as a choke leg; abutment means including said abutment leg of the magnetic shell and a support flange coupled to but spaced from said abutment leg for slidably engaging opposite sides of said flat control portion of said housing to maintain the choke leg of said magnetic shell at a predetermined spacing from said flat control portion of said housing and axially aligned with the central opening of said annular choke coil; means for limiting sliding movement of said magnetic shell to directions parallel to the axis of said choke coil, said means including an elongated slot in the flat control portion of said housing parallel to the axis of said annular choke coil; a slot engaging guide extending between said abutment leg and support flange positioned in said slot for engaging the longitudinal edges of said slot to restrain the linear movement of said choke leg, and manual control means connected to said magnetic shell positioned outwardly of said housing to provide for selective manipulation of the magnetic shell relative to the choke coil.

References Cited in the file of this patent
UNITED STATES PATENTS

| | | |
|---|---|---|
| 344,318 | Jones | June 27, 1886 |
| 712,521 | Halberg | Nov. 4, 1902 |
| 985,009 | Hovey | Feb. 21, 1911 |
| 1,894,928 | Wesche | Jan. 17, 1933 |
| 2,740,029 | Kueser et al. | Mar. 27, 1956 |